July 3, 1951  S. K. HAYNIE  2,559,537
FISHHOOK SETTER
Filed Sept. 4, 1948
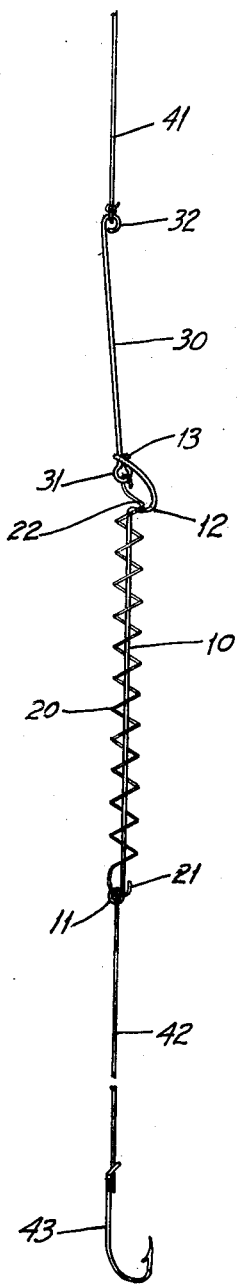
INVENTOR.
Steven K. Haynie
BY Philip M Haynie
AGENT Patented July 3, 1951

2,559,537

UNITED STATES PATENT OFFICE 2,559,537

FISHHOOK SETTER

Steven K. Haynie, El Reno, Okla.

Application September 4, 1948, Serial No. 47,920

1 Claim. (Cl. 43—15)

This invention relates to a device for automatically setting a fish hook.

There are a number of forms of still fishing devices. A single line and hook may hang from a cane pole stuck in the bank of a creek; a number of baited hooks, say from 75 to 100, may be included in a trot-line; a portion of the line and the baited hook may hang free in the water from a cork or float, or an auxiliary line may depend from a main fishing line the outer end of which is held at the bottom of a body of water by a weight. The first two are untended and depend solely upon the activities of the fish to set the hook and so secure itself. The latter two depend upon the fisherman's ability to detect the activities of the fish and to set the hook at the proper time. Failure to set the hook is frequent, due to the fisherman's inability to know exactly what the fish is doing, even though he can tell that the fish is disturbing the bait.

It is an object of my invention to provide a device capable of automatically setting the hook when the bait is sufficiently disturbed by the fish, useful in all types of still fishing.

It is a further object of my invention to provide in such a device the qualities of simplicity, ruggedness and reliability.

In the drawing, the single figure shows the hook setter in extended position, as it will appear in use.

Referring to the drawing, the device comprises the three principal parts, the shaft 10, the tension spring 20, and the spring release means 30.

The shaft 10 includes an eye 11 at one end, a shoulder 12 near the opposite end, and an eye 13 at said opposite end, said eye being in a plane which is substantially normal to the shaft. The spring shown is a coil spring having an eye or loop 21 engaged with the eye 11 and a loop 22 at the opposite end adapted to extend over or be engaged on the shoulder 12 when the spring is extended, said loop being provided with an eye at the end thereof. The release means includes a member 30 having an eye 31 at one end which is engaged with the end of loop 22 of the spring; its body portion passes through and is slidable in the eye 13 of the main shaft, and an eye or loop 32 is provided at the opposite end of said member.

It will be apparent that a pull on the eyes 11 and 32 will tend to straighten or lengthen the entire device and disengage the loop 22 from the shoulder 12. When this happens, the spring 20 will act quickly to reduce the distance between eyes 11 and 32.

I prefer to utilize the device as shown, that is, with the line 41 engaged with the eye 32 and the snell 42 and hook 43 depending from the eye 11. With the device set as is shown in the figure, a fish disturbing the bait on the hook 43 will cause the spring to be released and the hook will be given a quick jerk through a short distance determined by the difference between the contracted length of the spring and the length of the shaft 10 between the eye 11 and the shoulder 12.

I have found this very effective in use, a greater number of fish being secured than is possible where the device is not used.

It is possible, of course, to reverse the line and the hook, and I contemplate this mode of utilization of the hook setter. In the device shown in the drawing, the parts 10 and 30 have been formed from wire and the spring 20 has been shown as a coil spring surrounding the shaft 10. The spring need not be a coil spring, and it need not surround the shaft, though this is found preferable. Obviously, parts 10 and 30 are not necessarily formed from wire.

I claim:

A fish hook setting device comprising a first shaft having a first eye at one end and a shoulder and a second eye at the opposite end, said second eye lying in a plane substantially normal to the first shaft, a coil spring shorter than the shaft surrounding the shaft and having a loop at one end engaged with the first eye and a second loop at the other end adapted to extend over the shoulder, said second loop being provided with an eye at the end thereof and a second shaft passing through the second eye of the first shaft and having an eye at one end and line-attaching means at the opposite end, said last mentioned eye being engaged with the eye at the end of the second loop of the spring.

STEVEN K. HAYNIE.

REFERENCES CITED

The following references are of record in the file of this patent:

UNITED STATES PATENTS

| Number | Name | Date |
|---|---|---|
| 283,444 | Wentworth | Aug. 21, 1883 |